(12) United States Patent
Rommel

(10) Patent No.: US 7,498,554 B2
(45) Date of Patent: Mar. 3, 2009

(54) INTERIOR REAR VIEW MIRROR FOR VEHICLES, PREFERABLY MOTOR VEHICLES

(75) Inventor: Bernd Rommel, Fellbach-Schmiden (DE)

(73) Assignee: Visiocorp Patents S.a.r.l., Luxembourg (LU)

( * ) Notice: Subject to any disclaimer, the term of this patent is extended or adjusted under 35 U.S.C. 154(b) by 62 days.

(21) Appl. No.: 10/541,274

(22) PCT Filed: Dec. 19, 2003

(86) PCT No.: PCT/DE03/04242

§ 371 (c)(1),
(2), (4) Date: Jan. 5, 2006

(87) PCT Pub. No.: WO2004/060721

PCT Pub. Date: Jul. 22, 2004

(65) Prior Publication Data

US 2006/0145058 A1    Jul. 6, 2006

(30) Foreign Application Priority Data

Jan. 2, 2003   (DE) ................................ 103 00 232

(51) Int. Cl.
*H01L 27/00*  (2006.01)
*G02B 5/08*   (2006.01)

(52) U.S. Cl. ..................................... 250/208.1; 359/604

(58) Field of Classification Search ................. 250/221, 250/208.1; 359/604, 601, 602; 340/425.5, 340/901, 601, 602
See application file for complete search history.

(56) References Cited

U.S. PATENT DOCUMENTS

| 6,019,475 | A  | * | 2/2000 | Lynam et al. ............... 359/879 |
| 6,222,460 | B1 |   | 4/2001 | DeLine et al. |
| 6,631,316 | B2 | * | 10/2003 | Stam et al. ................... 701/36 |
| 6,980,092 | B2 | * | 12/2005 | Turnbull et al. .......... 340/425.5 |
| 2004/0032675 | A1 | * | 2/2004 | Weller et al. ................ 359/872 |

FOREIGN PATENT DOCUMENTS

| EP | 0 899 157 A | 3/1999 |
| GB | 2 190 516 A | 11/1987 |
| WO | WO 03/095269 A | 11/2003 |

* cited by examiner

*Primary Examiner*—Thanh X Luu
(74) *Attorney, Agent, or Firm*—Reising Ethington P.C.

(57) ABSTRACT

The invention relates to interior rear view mirrors, in the mirror housing (1) of which sensors are disposed that sit on an electronic board (13). Said rear view mirrors require substantial assembly space such that the assembly position of the sensor is limited. In order not to restrict the assembly position of the sensor, said sensor sits on a sensor board (12) that is separate from the electronic board (13). The two boards (12, 13) are interconnected by means of signals. The sensor board (12) can be embodied in a very compact manner such that the sensor located thereupon can be mounted in any appropriate position within the mirror housing (1). The interior rear view mirror is used for motor vehicles.

10 Claims, 4 Drawing Sheets

INTERIOR REAR VIEW MIRROR FOR VEHICLES, PREFERABLY MOTOR VEHICLES

CROSS-REFERENCE TO RELATED APPLICATIONS

This application is a National Stage of International Application No. PCT/DE2003/004242 filed Dec. 19, 2003, which claims priority to German Patent Application No. DE 103 00 232.4 filed on Jan. 2, 2003. The disclosures of the above applications are incorporated herein by reference.

FIELD OF THE INVENTION

The invention concerns an interior rearview mirror for vehicles, preferably motor vehicles.

BACKGROUND OF THE INVENTION

Interior rearview mirrors for motor vehicles are known which are equipped with an Electrochromic headlight glare sensor that detects the light from the headlights of following vehicles and darkens the mirror when a predetermined value is exceeded so that the driver is not dazzled. FIG. 4 shows such a rearview mirror with a mirror housing 21 that delimits a receiving opening for a mirror glass 22. The Electrochromic electronics circuit board is located behind the mirror glass 22 near one side edge 23 of the mirror housing 21. The headlight glare sensor 24 seated on the electronics circuit board is located near the side edge 23 of the mirror housing 21 and can be seen behind the mirror glass 22. Since the only installation possibility for the electronics circuit board is in the side region of the mirror housing 21, the sensor can only be placed in the side region in this known interior rearview mirror.

The object of the invention is to design the interior rearview mirror such that the sensor can be installed in any desired installation location even under cramped installation conditions.

This object is attained in an interior rearview mirror of the type according to the invention.

SUMMARY OF THE INVENTION

In the interior rearview mirror according to the invention, the sensor is seated on the sensor circuit board, which is spatially separated from the electronics circuit board. All the dimensions of the sensor circuit board are small, so that it can be installed at any desired location inside the mirror housing. In particular, the sensor circuit board with the sensor can be accommodated in the center region of the mirror glass or the mirror housing. Neither the actuator drive that is typically provided behind the mirror glass for the interior rearview mirror, nor the support plate for the mirror, pose obstacles to the installation of the sensor circuit board. The electronics circuit board can be built into the mirror housing where adequate room is available for its installation. The sensor circuit board and the electronics circuit board are connected to one another by signals so that the signals from the sensor reliably reach the electronics circuit board. The sensor lies in the detection region of the signals which strike the interior rearview mirror from the outside. The term signals should also be understood to include beams of light which originate from the headlights of following motor vehicles and strike the interior rearview mirror from behind.

Additional features of the invention are evident from the additional claims, the description, and the drawings.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DESCRIPTION OF THE DRAWINGS

The invention is described in detail below using an example embodiment shown in the drawings. They show.

DETAILED DESCRIPTION OF THE PREFERRED EMBODIMENTS

Figure 1:
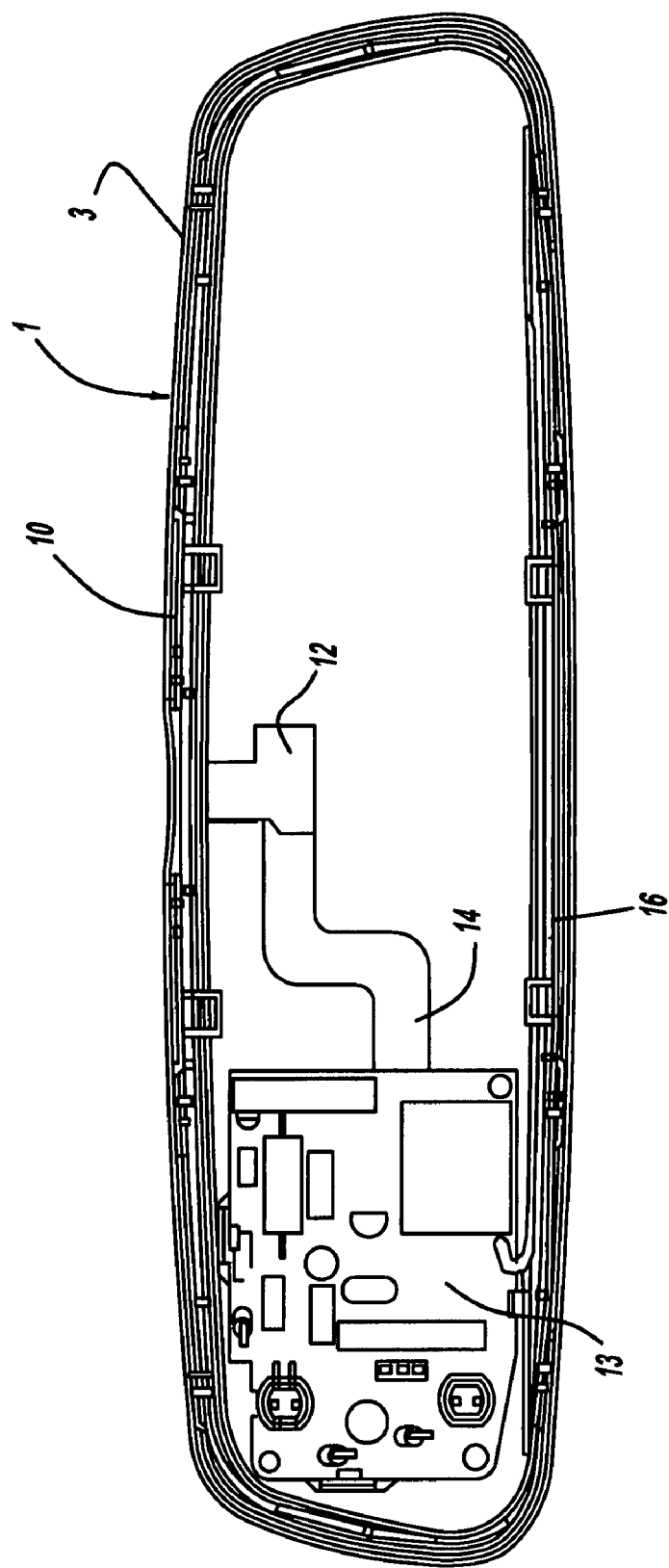
FIG. 1 a front view of an interior rearview mirror according to the invention without the mirror glass, FIG. 2 a cross-section through the interior rearview mirror from FIG. 1, FIG. 3 an enlarged view of the installation location of a sensor from the inventive interior rearview mirror in cross-section, FIG. 4 a front view of a prior art interior rearview mirror.
Figure 2:
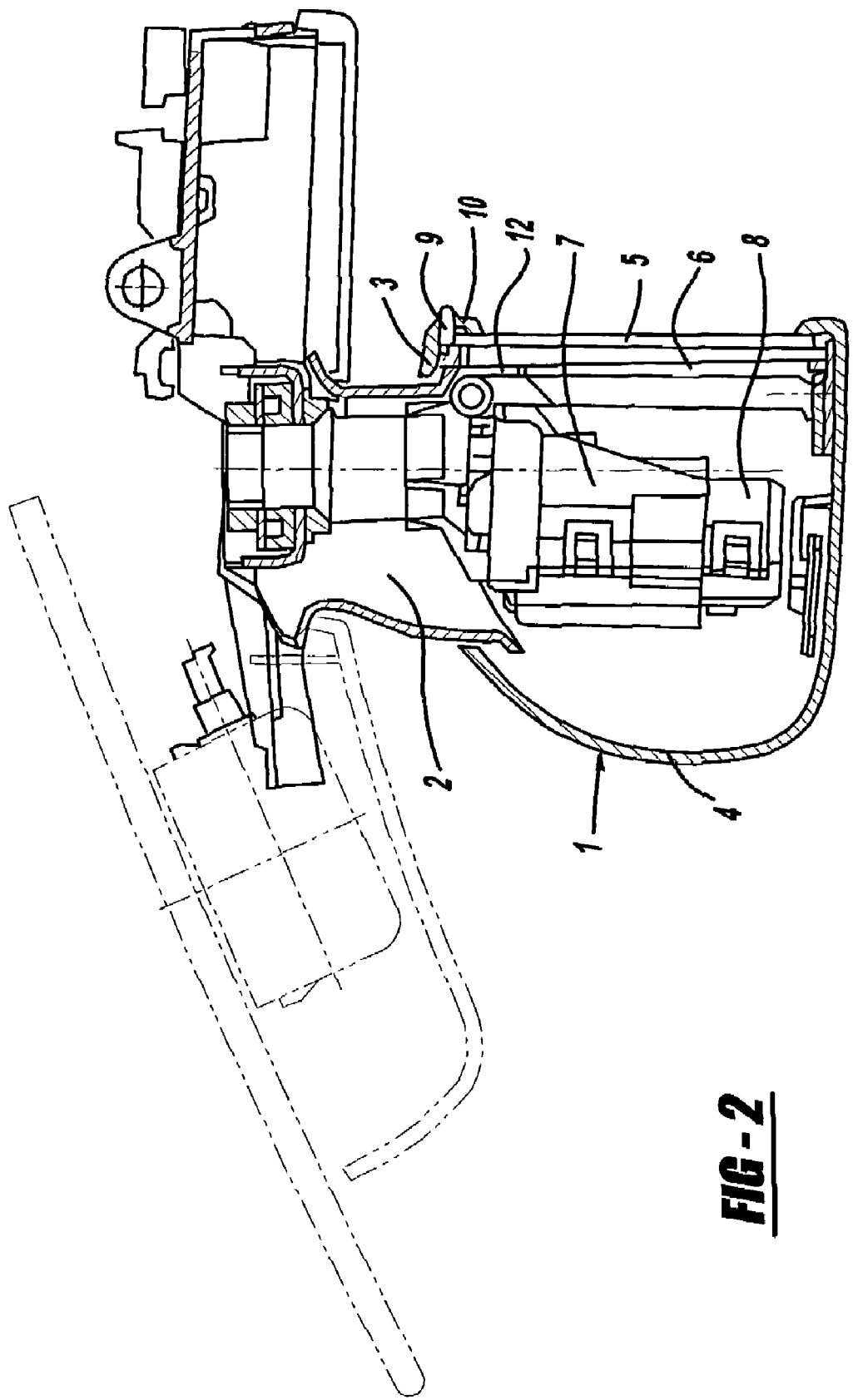

The interior rearview mirror for motor vehicles has a mirror housing 1, which is attached within the motor vehicle in a known manner by means of a mirror base 2, for example to the roof liner or to the windshield of the motor vehicle. The mirror housing 1 consists of a frame 3 and a cover 4, which preferably is detachably connected to the frame 3, for example by means of a snap-in connection. The frame 3 accommodates a mirror glass 5, which in the example embodiment is an Electrochromic glass and is seated on a mirror glass bracket 6. As is apparent from FIG. 1, the frame 3 has an approximately rectangular outline with rounded corners. The cover 4 of the mirror housing 1 is concave in cross-section (FIG. 2) and accommodates a drive 7, with which the mirror housing 1 can be moved by motor relative to the mirror base 2 in order to adjust the interior mirror for the driver of the motor vehicle. Such drives are known and thus are not explained in detail.

The drive 7 is advantageously a memory drive by means of which the interior rearview mirror can be moved by motor to stored positions. The drive 7 is located at the midpoint of the width of the mirror housing 1. A support plate 8 of the interior rearview mirror is also located in this region.

Figure 3:
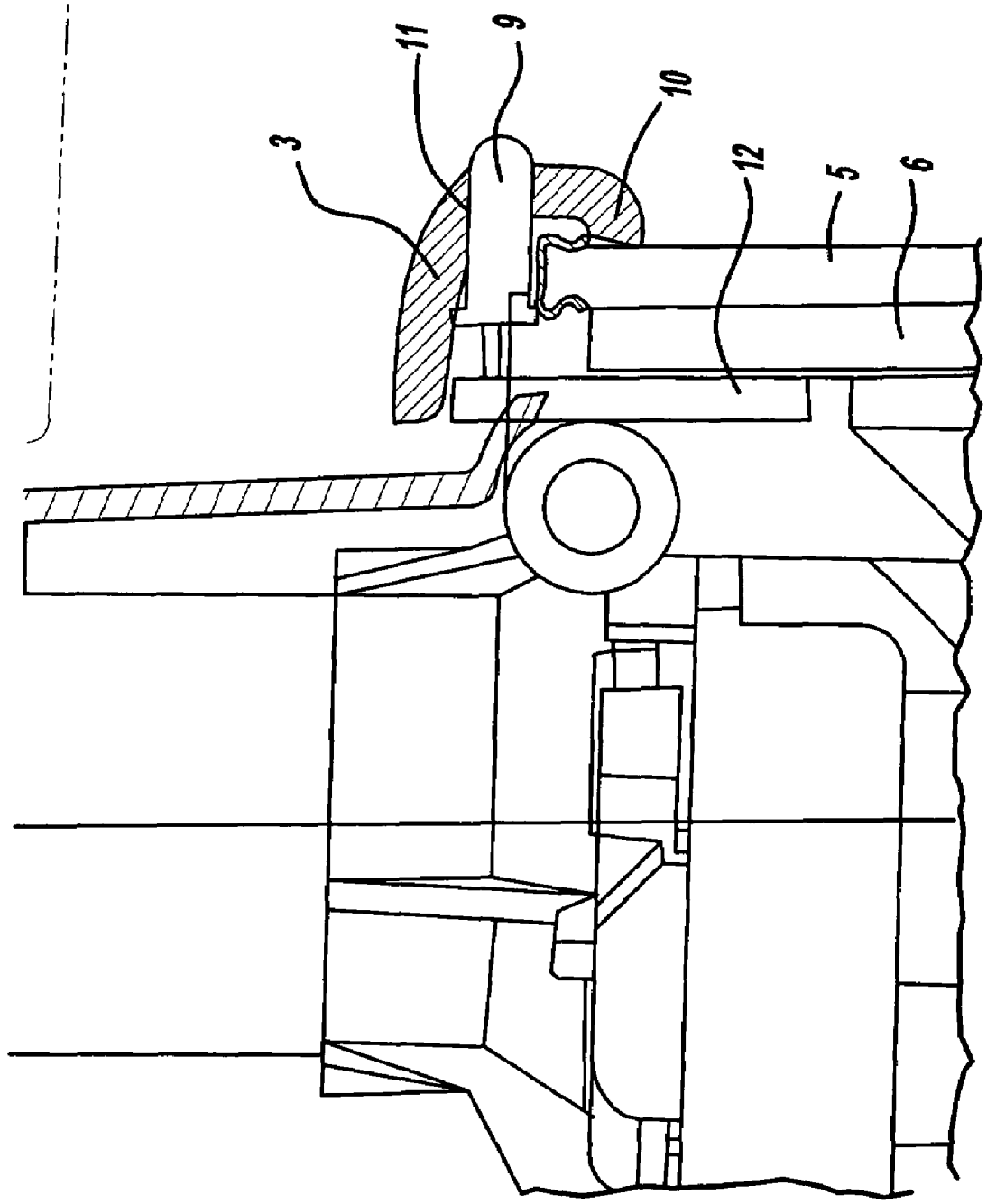
Figure 4:
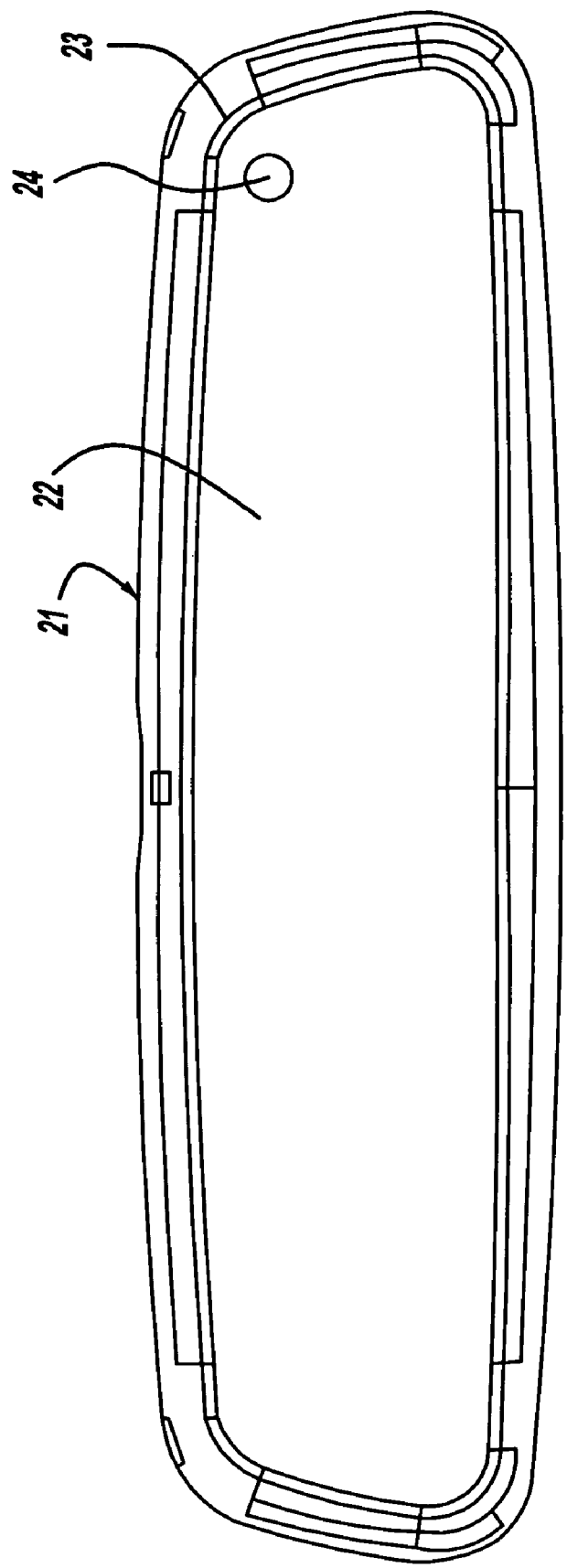

The interior rearview mirror is provided with at least one headlight glare sensor 9, which in the example embodiment is arranged at the midpoint of the length at the top longitudinal edge 10 of the frame 3. This headlight glare sensor 9 is directed to the back, viewed in the vehicle's direction of travel, and senses the light coming from the vehicles following behind. When a predefined light intensity is exceeded, the headlight glare sensor 9 generates a signal in a known way, which signal darkens the EC mirror glass 5 so that the driver is not dazzled by the light coming from behind. The headlight glare sensor 9 is seated in a receiving opening 11 (FIG. 3) in the top longitudinal edge 10 of the frame 3. The headlight glare sensor 9 projects slightly beyond the frame 3 in the example embodiment. However, it is also possible to accommodate the headlight glare sensor 9 in the longitudinal edge 10 of the frame 3 such that it does not extend beyond the longitudinal edge. It can also be recessed behind a covering that is transparent to light beams. In this case, the receiving opening 11 is designed such that the light coming from behind can be sensed satisfactorily by the headlight glare sensor 9.

The headlight glare sensor 9 is seated on a sensor circuit board 12, which is arranged directly behind the mirror glass bracket 6. The circuit board is very flat in design and has only a very small footprint, so the sensor circuit board 12 can be accommodated without difficulty, even in small installation spaces. The sensor circuit board 12 has a footprint of approximately 1 cm$^2$ or less, for example. The sensor circuit board 12 with the headlight glare sensor 9 mounted thereupon can be held on the frame 3 by a snap-in connection, for example. Because of the small dimensions, the sensor circuit board 12 can be accommodated easily in the region between the drive 7 and the mirror glass bracket 6 in the center of the interior rearview mirror.

The electronic/electrical components necessary for evaluating the signals of the headlight glare sensor 9 are located on a circuit board 13 (FIG. 1), which is accommodated in the region next to the drive 7 in the mirror housing 1. As is evident from FIG. 1, this main circuit board 13 is located near one narrow side of the mirror housing 1. There is sufficient space in this location to accommodate the main circuit board 13 in the mirror housing 1. The circuit board is affixed in the mirror housing in a suitable manner.

The sensor circuit board 12 and the main circuit board 13 are connected by means of a flexible conductive trace 14, which is thin in design and therefore can be conveniently accommodated in the mirror housing 1, even in cramped installation conditions.

In place of the flexible conductive trace 14, it is also possible to transmit the signals of the headlight glare sensor 9 wirelessly to the appropriate elements on the main circuit board 13.

Due to the design described, the Electrochromic headlight glare sensor 9 can be accommodated in the center in the interior rearview mirror. Due to the spatial separation of the main circuit board 13 and the sensor circuit board 12, the headlight glare sensor 9 can also be placed off-center at any desired location in the interior rearview mirror. The headlight glare sensor 9 may, for example, also be located on the bottom longitudinal edge 15 (FIG. 1) of the frame 3. Moreover, additional headlight glare sensors or other sensors can also be provided on the interior rearview mirror, each being connected to the main circuit board 14 by means of a flexible conductive trace or wirelessly.

In addition, map lights, console lighting, transmitters and/or receivers for garage door openers, loudspeakers, compass devices and the like may also be accommodated in the mirror housing 1.

The description of the invention is merely exemplary in nature and, thus, variations that do not depart from the gist of the invention are intended to be within the scope of the invention. Such variations are not to be regarded as a departure from the spirit and scope of the invention.

The invention claimed is:

1. Interior rearview mirror for vehicles, comprising:
    a mirror cover defining a rearward opening and a frame thereabout;
    a mirror operatively secured within said mirror cover and visible through said rearward opening;
    a backing plate fixedly secured to said mirror;
    a drive operatively connecting said backing plate to said mirror cover and for moving said mirror with respect to said frame and said mirror cover;
    an electronics circuit board secured to said mirror cover for controlling said drive;
    a sensor arranged in said frame for generating signals relating to ambient conditions arriving at said interior rearview mirror from outside; and
    a sensor circuit board fixedly secured to said sensor and spatially separated from said backing plate and from said electronics circuit board, and said sensor circuit board arranged in the region between said drive of said interior rearview mirror and said mirror, such that said sensor and said sensor circuit board maintain a constant orientation with respect to said frame and independent of an orientation of said mirror.

2. Interior rearview mirror according to claim 1, wherein the sensor circuit board is attached at the edge of the mirror housing.

3. Interior rearview mirror according to claim 1, wherein the sensor circuit board and the electronics circuit board are connected to one another by at least one flexible line.

4. Interior rearview mirror according to claim 3, wherein the flexible line is a conductive trace.

5. Interior rearview mirror according to claim 1, wherein the sensor circuit board is wirelessly connected by signals to the electronics circuit board.

6. Interior rearview mirror according to claim 1, wherein the sensor is accommodated in a receiving opening in the edge of the mirror housing.

7. Interior rearview mirror according to claim 1, wherein the sensor is centered on the edge of the mirror housing.

8. Interior rearview mirror according to claim 1, wherein the sensor is an EC headlight glare sensor.

9. Interior rearview mirror according to claim 1, wherein the mirror housing has a frame and a cover connected therewith.

10. Interior rearview mirror according to claim 1, further comprising a mirror glass, wherein said mirror is an electrochromic mirror glass.

* * * * *